Aug. 2, 1960
C. F. VARN
2,947,030
FEEDING MECHANISM FOR EXTRUDERS
Filed Aug. 29, 1956
7 Sheets-Sheet 1
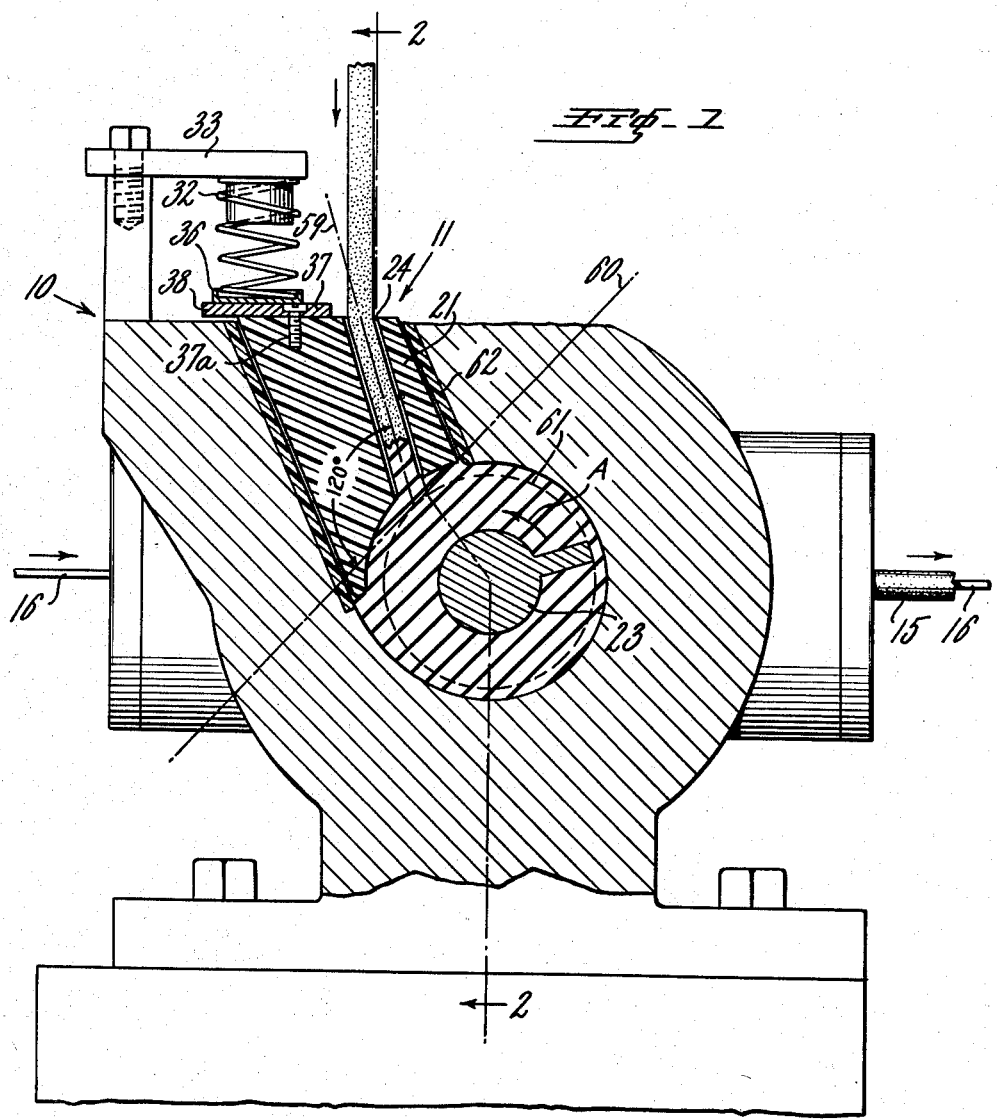
INVENTOR.
CHARLES F. VARN
BY
ATTORNEY

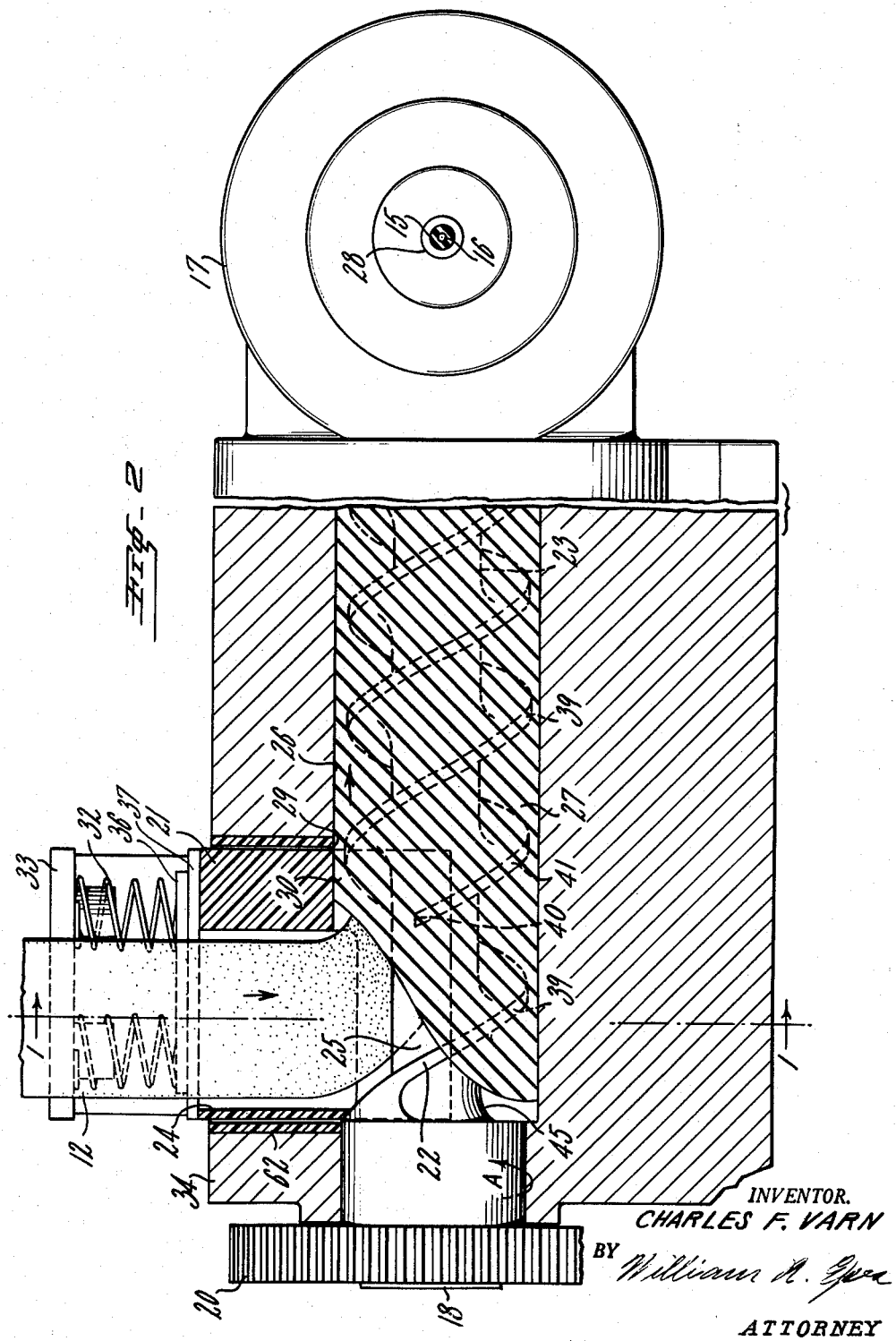

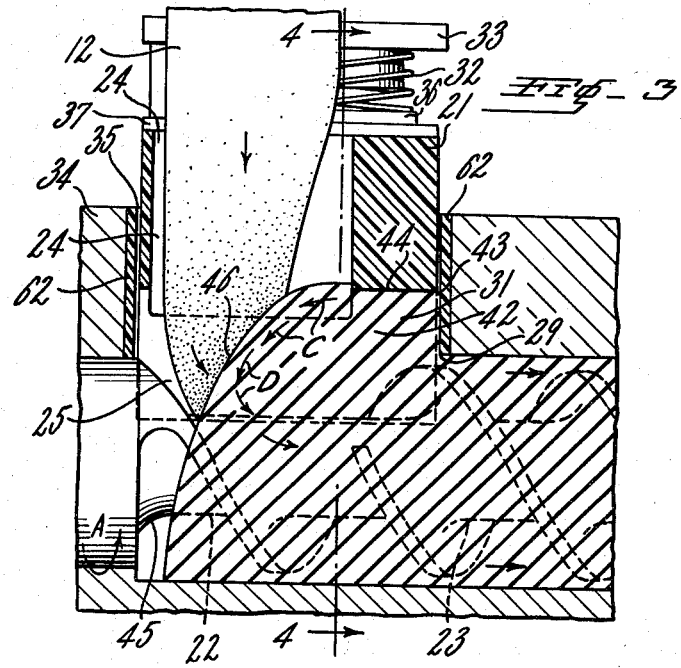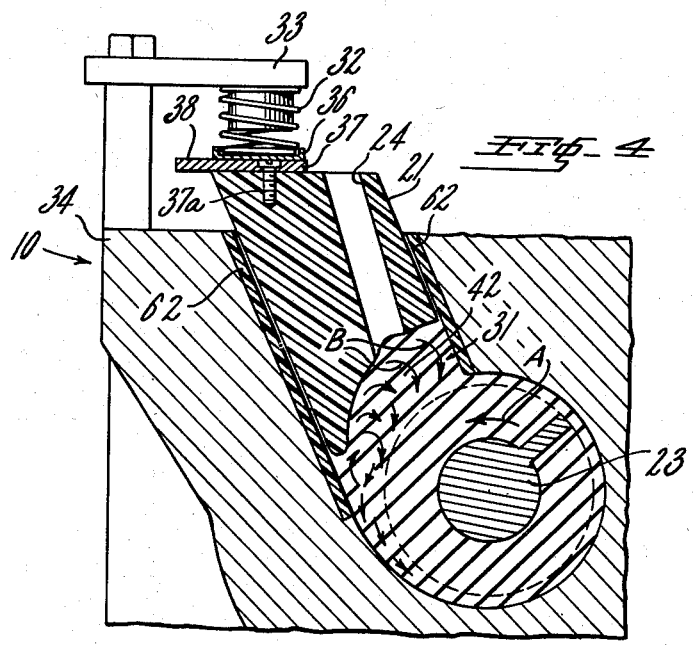

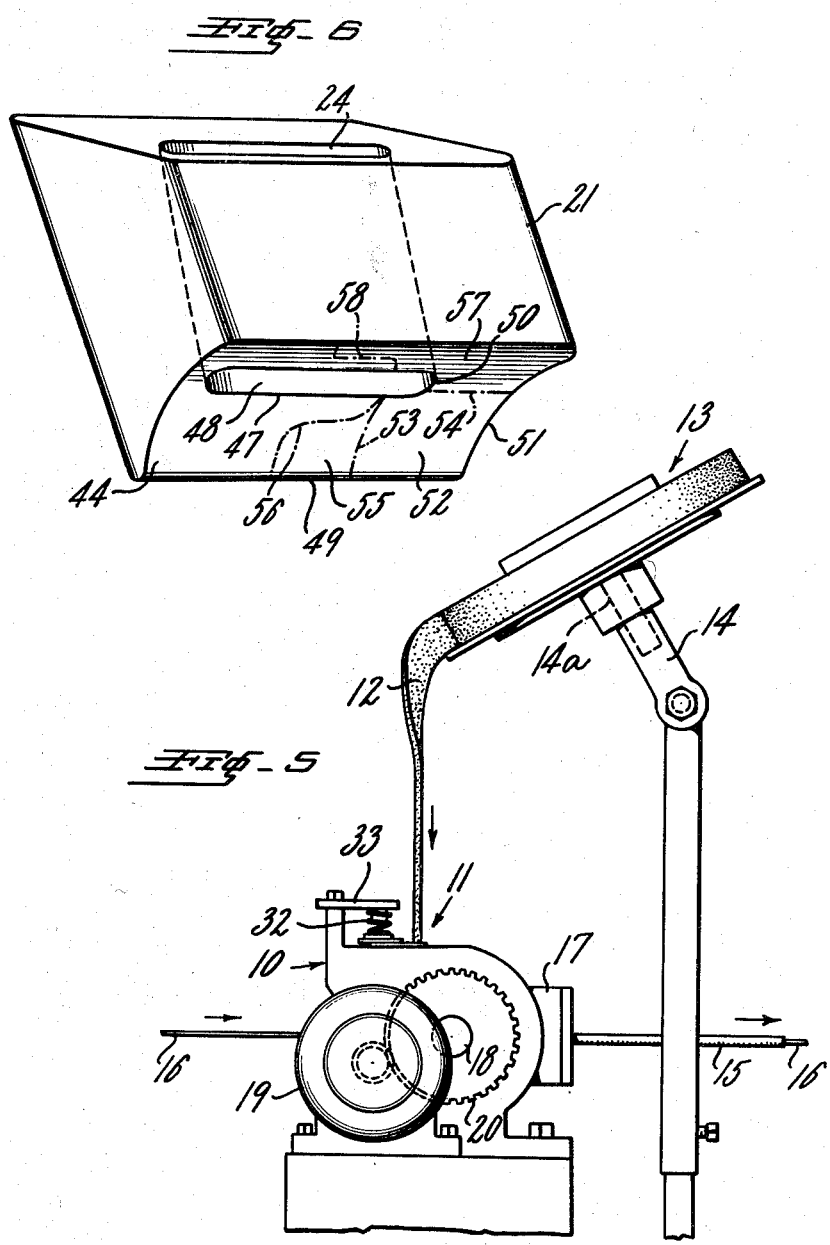

Aug. 2, 1960
C. F. VARN
2,947,030
FEEDING MECHANISM FOR EXTRUDERS
Filed Aug. 29, 1956
7 Sheets-Sheet 5
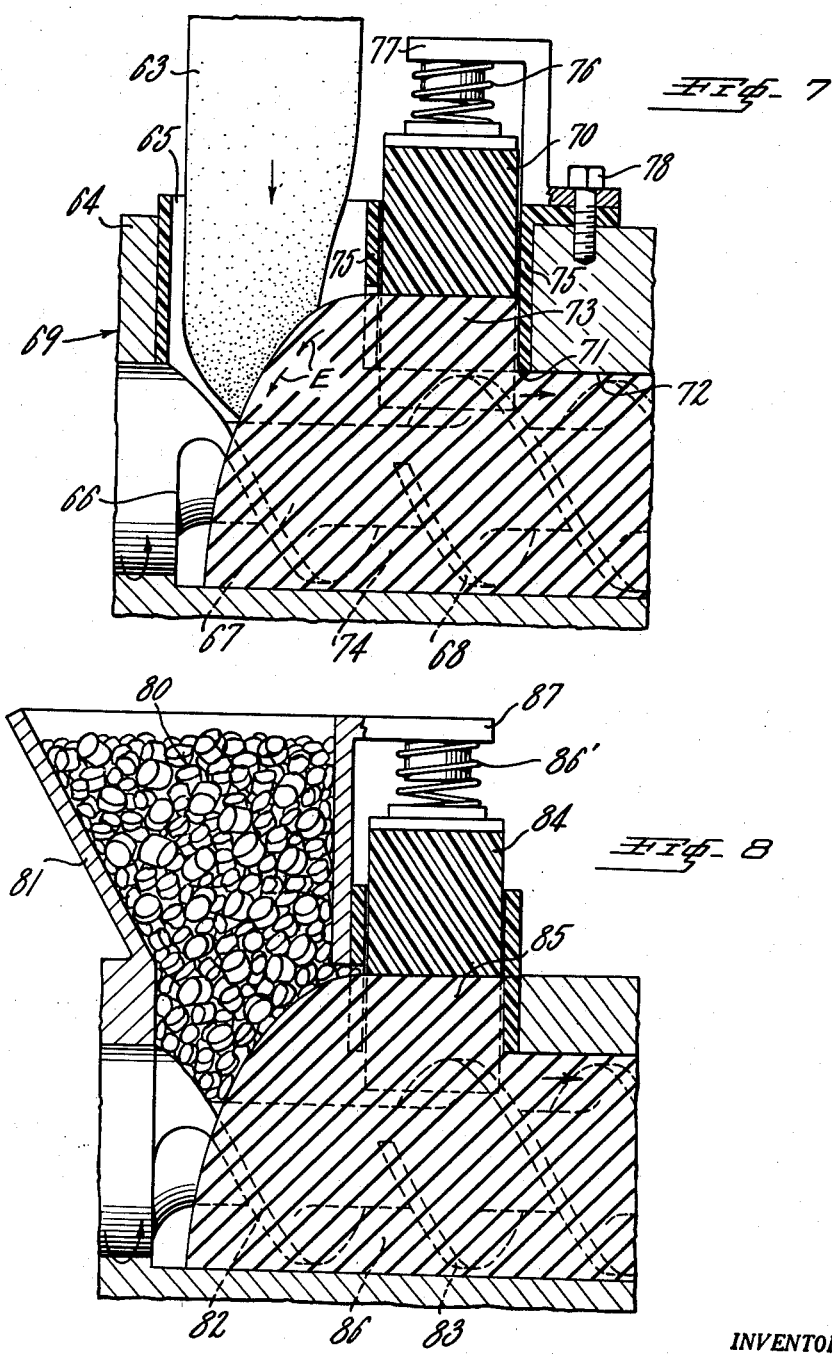
INVENTOR.
CHARLES F. VARN
BY
ATTORNEY

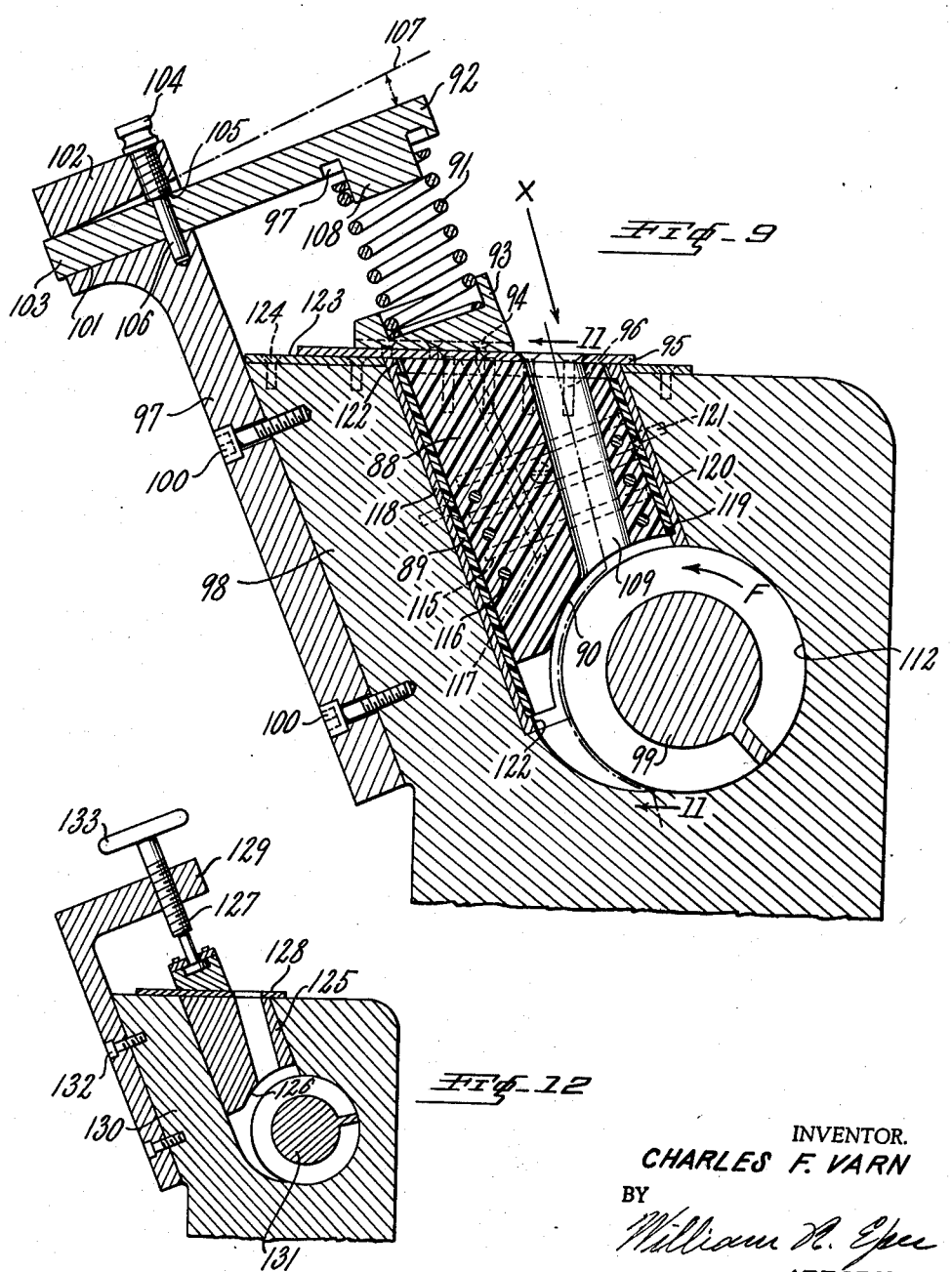

Aug. 2, 1960
C. F. VARN
2,947,030
FEEDING MECHANISM FOR EXTRUDERS
Filed Aug. 29, 1956
7 Sheets-Sheet 7
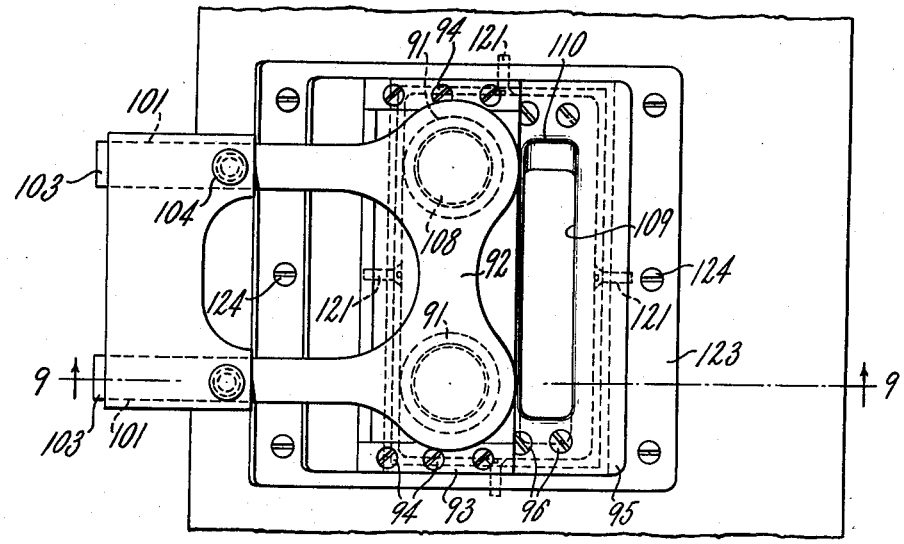
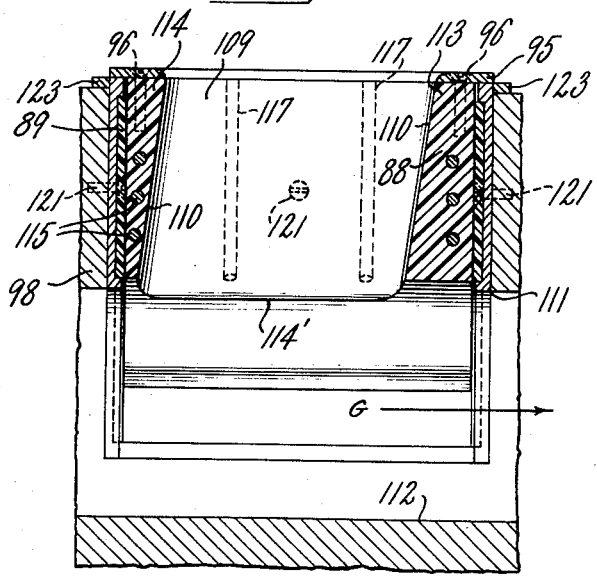
INVENTOR.
CHARLES F. VARN
BY William R. Eyer
ATTORNEY

United States Patent Office 2,947,030
Patented Aug. 2, 1960

2,947,030

FEEDING MECHANISM FOR EXTRUDERS

Charles F. Varn, West New Brighton, N.Y., assignor to United States Rubber Company, New York, N.Y., a corporation of New Jersey Filed Aug. 29, 1956, Ser. No. 606,871

3 Claims. (Cl. 18—12)

This invention relates to the combination of an extruder of plastic material and an improved material feeding mechanism comprising an improved construction of the material receiving end of the feed screw, and an apparatus which is adapted to apply yieldable, or non-yieldable pressure to the accumulation of excess material at the entrance to the extruder barrel, said screw construction and pressure applying apparatus being adapted to control the accumulation of said excess material, which in turn controls or assists in the control of the supply of the incoming plastic material to the receiving end of the extruder in proportion to the rate of discharge of the material from the extruder.

In the operation of a conventional extruder, a strip of plastic material to be extruded is drawn by the receiving end of the screw into the feed hopper, or housing for such end, until the barrel of the extruder and the troughs between the flights of the screw are stuffed with the plastic material, and then it is forced out of the discharge end or die of the extruder. During the continued operation of the extruder, the plastic material is drawn in at a greater rate than it is discharged from the die, and the excess material, which has been drawn into the trough or troughs of the receiving end of the screw, is squeezed out into the hopper at the entrance to the extruder barrel. Such material is referred to herein as the accumulation of, or accumulated excess material, which is in addition to the material remaining in the trough or troughs of the screw.

This invention is particularly applicable to the extrusion of plastics, such as natural or synthetic rubber compounds which have an elastic memory. In extruding such plastics, it is necessary to maintain a substantially uniform pressure on the plastic at the die in order to maintain uniform outside cross sectional dimensions of the extrusion. In order that such uniform pressure may be maintained, it is necessary that the plastic be squeezed out of the screw continually and thereby maintain some accumulated excess material on hand at all times.

The accumulated excess material is formed by the revolving action of the screw into the shape of a somewhat mutilated conical roller, which is confined between the feed screw and the sides of the feed hopper, with the base of the cone placed adjacent to the entrance to the extruder barrel. Such material rolls around on the screw, but will not reenter the screw unless relatively high pressure is applied thereto. Furthermore, unless the incoming supply of plastic to screw is restricted, the size of the conical roller continues to increase by the addition of the material being squeezed out of the screw, until the entire throat of the hopper is filled by the accumulated excess material, which then cuts off the incoming supply strip of plastic from the screw. If such a condition arises, the screw will soon discharge the plastic therein and the pressure at the die will fall, unless the receiving end of the screw is kept filled, by first forcing the accumulated excess material into the troughs of the screw and then restarting the feed of the supply strip to the screw.

Heretofore, the feed of the plastic supply strip has been restricted by intermittently stopping the strip and sufficient continuous pressure has not been applied to the accumulated excess material to force it back into the screw at the rate at which it accumulated. Because of the intermittent feed and the lack of continuous pressure, uncontrollably large accumulations were built up, which cut off the supply strip from the screw. The supply of plastic material to the screw was then derived from the accumulated excess material which becomes stiff, and because of the difficulty of forcing this stiff material back into the receiving end of the feed screw, it became incompletely stuffed, and the plastic material ceased to be squeezed out at the entrance to the barrel. In that event the extruder barrel became incompletely stuffed, and the pressure on the plastic at the die dropped or pulsations in such pressure occurred, which in turn caused the production of rough and porous extrusions of variable outside cross-sectional dimensions.

The relatively small circumferential distances between the screw flights at the receiving end of prior feed screws also increased the difficulty of returning the excess material to the troughs of the screw, and contributed to the above mentioned poor results.

The present invention is an improvement upon the foregoing method of feeding an extruder, because of its continuous feed and its ability to completely stuff each feed flight or trough of the screw at its receiving end before the material is forced into the extruder barrel. The barrel is so loaded that a maximum output of the screw and a minimum extrusion temperature results, whereby a dense and non-porous extrusion is produced. The foregoing objects are obtained, and the disadvantages of the prior methods and apparatus for feeding an extruder are eliminated or greatly reduced by constantly drawing the supply material into the screw, at a rate directly proportional to the discharge rate at the die and inversely proportional to the quantity of accumulated excess material, and at the same time constantly feeding the accumulation back into the receiving end of the screw. The foregoing functions are accomplished by the improved construction of the feed screw which assists in concentrating the accumulated excess material near the entrance to the extruder barrel, and also provides space in the trough or troughs of the receiving end of the screw for the accumulated material to reenter, which is caused to do so by the constant application of adequate pressure exerted thereon by a yieldable plunger, or feed block.

Another important feature of the invention is the adhesion resistant character of the pressure applying surfaces of the plunger and the surfaces on which the plunger slides. Such surfaces prevent the tacky plastic material from adhering thereto, and permit the revolving conical roller of accumulated excess material to slip thereon and be free to reenter the screw.

The invention, its foregoing objects and advantages are further described in reference to the accompanying drawings, in which:

Fig. 1 is a cross-sectional view taken on line 1—1 of Fig. 2 through the feed hopper of a conventional extruder for extruding a plastic material, such as a milled rubber compound as an insulating jacket for an electrical conductor, and showing the material feeding apparatus embodying this invention in combination therewith, at the time all of the flights of the feed screw have been fully stuffed within the barrel of the extruder, and before sufficient excess plastic material has accumulated underneath the feeder block at the entrance to the extruder barrel to force the block upward;

Fig. 2 is a longitudinal view of the extruder shown in Fig. 1 taken partly in section on line 2—2 of Fig. 1, and showing the discharge end of the extruder die in elevation with a cross section of the insulated electrical conductor therein;

Fig. 3 is a cross sectional view of a portion of the feed hopper, extruder screw, and barrel therefor corresponding to the same portions shown in Fig. 2, excepting the parts are shown at the time a maximum accumulation of excess material has been built up at the entrance to the extruder barrel and underneath the feeder block, which has been forced upwardly by the pressure of the accumulated material against the yieldable pressure of the block exerted thereon;

Fig. 4 is a transverse cross section of the feed hopper taken on line 4—4 of Fig. 3;

Fig. 5 is an end view of the extruder embodying this invention and showing the source of supply of material which is being fed into the receiving end of the extruder in the form of a flat strip of stock from a reel;

Fig. 6 is a perspective view of a feeder block through which the supply material to be extruded is fed, and which applies the yieldable pressure to the accumulated excess material at the entrance to the extruder barrel;

Fig. 7 is a modified form of the improved feeding mechanism embodying this invention shown in longitudinal cross section;

Fig. 8 is still another modified form of the improved feeding mechanism embodying this invention for feeding pellets of material to the feed screw;

Fig. 9 is a cross section of a further modified form of the invention taken through the feed hopper on line 9—9 of Fig. 10, and showing an improved feed block, spring actuating means, and guide way for the block;

Fig. 10 is a top plan view of the feed hopper looking in the direction of the arrow X in Fig. 9;

Fig. 11 is a cross section of the feed block, guide way therefor, and a portion of the feed hopper taken through the feed block slot, on line 11—11 of Fig. 9; and Fig. 12 is a view of a manually adjustable feed block, showing parts in section and corresponding to the view of the automatically adjustable block shown in Fig. 9.

This invention is illustrated in combination with a conventional type of cross head extruder for extruding a plastic insulating jacket onto an electrical conductor. As illustrated in Fig. 5, the extruder 10 is provided with the feeding mechanism 11 embodying this invention. A flat strip 12 of plastic material is supplied to the mechanism 11 from a reel 13, which is supported on a stand 14. In this application of the invention, the strip material is extruded in the form of an insulating jacket 15 onto a conductor 16 from the cross head 17 of the extruder 10. The end 18 of the feed screw is driven by a motor 19 through a train of gears 20.

Referring to Figs. 1 and 2, the feeding mechanism 11 comprises a yieldably pressed feed block or plunger 21 and a specially constructed material receiving end 22 of the feed screw 23. The feeding mechanism 11 is placed in operation by manually pulling the end of the outer coil of the strip 12 from the reel 13 (Fig. 5) and pushing it through a slot 24 in the feed block 21 and into the trough 25 of the feed screw, which rotates in the direction of the arrow A. The receiving end 22 of the feed screw 23 picks up the end of the strip and forces it into the extruder barrel 26 until it is completely stuffed with the plastic mass 27, which is then extruded through the die 28 in the form of the insulating jacket 15. As in the case of a conventional extruder, a mass of material is drawn in from the strip 12 at a faster rate than the plastic material is extruded through the die 28. The excess material drawn in by the feed screw accumulates at the entrance 29 to the extruder barrel 26 and underneath the feed block 21. As shown in Fig. 2, the accumulation of excess material 30 is beginning to be built up underneath the feed block 21. This is a minimum quantity of accumulation of excess material that may be tolerated in order to insure the complete stuffing of the extruder barrel 26. Consequently the design of the feeding apparatus and the condition of the plastic fed to the extruder should be such that the feed block 21 will not return to the position shown in Fig. 2 after the accumulated excess material has built up to a higher position.

Unless some change in the operating conditions takes place, the accumulated excess material 30 will continue to build up from this minimum quantity until a maximum amount of accumulated excess material 31 is reached, as shown in Figs. 3 and 4. As the material 30 accumulates underneath the block 21, it is forced upwardly against the pressure of the compression springs 32, which are interposed between the block 21 and an arm 33, which is affixed to the feed hopper, or housing 34 of the receiving end 22 of the feed screw 23. The feed block 21 is slidably mounted in the opening 35 of the hopper. As shown in Fig. 4, a locating plate 36 for the springs 32 is supported on a second plate 37 affixed to the top of the block 21 by screws 37a. The second plate 37 is provided with a projection 38, which overhangs the top of the hopper 34 and limits the downward movement of the feed block 21. As the block 21 rises from its lower position in Fig. 1 to its upper position in Fig. 4, the spring locating plate 36 slips on the bottom plate 37 toward the slot 24.

An important feature of the receiving end 22 of the feed screw 23 is that it is provided with a trough 25 of relatively great unbroken longitudinal width in order that the adhesive connection between the strip and the plastic material at the receiving end of the feed screw may be maintained. For that purpose, the receiving end 22 of the feed screw is provided with a single flight 39 up to a point 40 on the periphery of the screw adjacent to the entrance 29 to the barrel 26, and from that point on forwardly, the feed screw 23 is provided with two flights 39 and 41. The second flight 41 begins at the point 40 underneath the feed block 21. This construction of the flights at the receiving end 22 of the screw concentrates the accumulated excess material 30—31 near the entrance 29 to the barrel, and retards the filling of the single trough 25 with the plastic material. Therefore the trough 25 remains partially empty so that it can continually receive and draw some material from the strip 12 and maintain an adhesive connection with the plastic being drawn into the screw.

The maintenance of the trough 25 partially empty also permits the accumulated excess material 30—31 to be continually re-fed back into the trough and thence into the barrel 26. The function of refeeding such material is performed by the resilient pressure continually exerted on the accumulated excess material 30—31 by the feed block 21. As the accumulated excess material 30—31 builds up, it is formed into a flattened, or somewhat mutilated conical roller 42 with its base 43 adjacent to the entrance 29 of the extruder barrel 26. The roller 42 of plastic material rolls on the feed screw 23 and the plastic material contained in the trough thereof, as indicated by the arrows B in Fig. 4, and it is confined between the bottom 44 of the block 21 and the feed screw. The bottom 44 of the block 21 exerts a continuous resilient pressure on the accumulated excess material 30—31, and as it rolls around underneath the block, the material 30—31 is elongated by the rolling action and forced towards the rear end 45 of the receiving end of the feed screw, or towards the small end 46 of the conical roller, as indicated by the arrows C. The flow of the material 30—31 axially of the screw 23 forces the incoming strip rearwardly along the axis of the screw, and retards the rate at which the strip is drawn into the partially filled trough 25. As viewed in Fig. 3, the right side of the strip 12 is retarded to a greater extent by the accumulated excess material than the left side, which latter side is stretched and thinned out by the pull thereon of the material in the partially empty trough 25, as it is continually drawn into the screw. It is also noted that the conical end 46 of the accumulated excess material is being continually drawn into the partially empty trough 25 with the left side of the strip 12, as indicated by the arrows D. Due to the above behavoir of the accumulated excess material 30—31 under the pressure of the feed block 21, as the material 30—31 builds up, it reduces the rate of intake from the strip material, while the rate of return of accumulated excess material 30—31 increases. This process goes on until there is a balance between the mass of material drawn in from the supply strip 12, and that discharged through the die 28. However, such balance is only momentary, because there are continuous changes in operating conditions (such as variations in cross section of wire or core being covered, speed of screw and plasticity of plastic compound), which alter the rate of discharge of the plastic through the die 28. Such momentary balance may be reached at any point in the movement of the block above the position shown in Fig. 2. Generally for the best operation, the block 21 will come to a pulsating balance, or position, near its upper position shown in Fig. 3. The strength of the springs 32 should be chosen in respect to the plasticity of the accumulated excess material to cause the feed block 21 to assume such upper position. Therefore the block 21 is in constant movement up or down, as the case may be, in maintaining the balance between the rate of intake from the strip 12 and the rate of discharge through the die 28.

The clearance between the block 21 and the walls of the hopper, or liner therefor, which act as guides for the block, should be made as small as possible consistent with the free movement of the block so as to prevent the accumulated excess material from being forced past the bottom of the block. If relatively large amounts of material escapes by the bottom of the block, the pressure of the block on the material is relieved. Such escaped material may become wedged in the clearance space and stop the movement of the block. In any event the block cannot force such escaped material back into the feed screw. In order to prevent the escape of the material, at least the bottom of the feed block 21 is made to fit closely in contact with parallel walls of the hopper, and the movement of the block is guided so that the close fit of block and hopper is maintained throughout the movement of the block. As shown in Figs. 1 and 2, the outside walls of the block are parallel to and slide on the inside walls of the hopper, and a minimum of clearance is maintained therebetween in the area opposite the pressure of the accumulated excess material.

To further insure a close sliding fit between the bottom end edge 51 of the feeding block 21 and the corresponding end wall of the housing opening 35, one of the springs 32 for exerting pressure on the block 21 is located substantially over the center of pressure of accumulated excess material 30—31, and the other spring 32 is located along the axis of the screw 23 near the rear end of the block 21 and off set from the center of pressure of the accumulated excess material. This arrangement places the center of the pressure exerted by the springs 32 on the block at a point between the center of pressure of the accumulated excess material and the rear of the block 21, which causes the block to cant longitudinally in respect to the axis of the screw when pressure is exerted on the block by the accumulated excess material. The rear end of the block tends to be forced downwardly with respect to the front end, and the front bottom end edge 51 of the block 21 is held in close contact with the corresponding end of the opening 35 in the housing 34. This construction provides a greater tolerance in the fit between the block and the opening 35 therefor, and maintains a close sliding fit when wear takes place between the walls of the block 21 and the opening 35.

The slot 24 is located in the block 21 so that the accumulated excess material 30—31 will not back up into the slot to such an extent that it may become wedged and retained therein, and it is also so located that the strip of material 12 will be drawn into the feed screw and not be cut off by the material backing up against the bottom 44 of the block 21, or the revolving accumulated excess material. In order that these functions may be accomplished, as shown in Figs. 1, 2 and 6, the elongated side 47 of the discharge end 48 of the slot 24 is placed remote from the bottom edge 49 of the block, and the narrow end 50 is placed remote from the bottom end edge 51 of the block which is placed adjacent to the entrance 29 to the extruder barrel. By so placing the discharge end 48, a relatively large area 52 is provided on the bottom of the block 21 as indicated in Fig. 6 at the lower right corner as marked off by the dot and dash lines 53 and 54. The area 52 is substantially outside of the discharge end 48 of the slot 24, and the greatest pressure of the accumulated excess material 30—31 is exerted against such area. The accumulated excess material 30—31 bears with less pressure upon the area 55 between the dot and dash lines 53 and 56, and upon the area 57 between the dot and dash lines 54 and 58 than upon the area 52. The accumulated excess material 30—31 extends over the narrow edge 50 of the discharge end 48 of the slot 24 and projects to some extent into the discharge end, as particularly shown in Fig. 4.

The combined pressures exerted on the bottom 44 of the block 21 is sufficient to force the block upwardly against the pressure of the springs 32 to permit the maximum amount of accumulated excess material 30—31 to be built up, as shown in Figs. 3 and 4, without causing the material to become wedged and retained in the discharge end 48 of the slot 24. The pressure exerted by the springs 32 on the block 21 is selected to apply sufficient pressure to the accumulated excess material 30—31 to cause it to flow towards the rear end 45 of the screw as shown by the arrows C in Fig. 3. In the case of a John Royle Perfected No. 2 Extruder, it has been found that two springs having the rating of 184 pounds each are sufficiently strong to exert the required pressure on the block 21. In such case the springs 32 are installed so that when the block is at its lowest point, zero pressure is exerted thereon by the springs. The block is capable of rising 1¼ inches, and when the maximum accumulated excess material 31 is built up, the springs 32 exert a combined pressure of 460 pounds on the block 21. The foregoing spring rating is given as an example only, which is applicable to the above mentioned extruder. It will be understood that the total spring pressure will vary with different types, and sizes of extruders. The spring pressure should be sufficient to return the accumulated excess material to the trough of the screw, but such pressure should not so restrict the yieldable action of the block as to prevent the normal build up of the accumulated excess material. It has been found with the above mentioned extruder that the rise of the block preferably should not exceed one inch, which will produce a total pressure of about 360 pounds where two 184 pound springs are used.

It has been found in the case of the particular extruder mentioned above, that in order to provide the best conditions under which the strip material 12 may be drawn into the feed screw, the angle of the slot 24 should be such that its center line 59 as shown in Fig. 1, should make an angle of 120° with the tangent 60 to the flight circle 61 at the point of intersection of the line 59, but the angle of 120° may be varied by 20° plus or minus and still obtain good results.

It is very important that the surfaces of the block 21 which come in contact with the plastic material in the feed hopper 34 be made of a material to which the plastic will not adhere. Under the pressure of the feed block 21 the accumulated excess material 30—31 tends to back up in the small amount of clearance between the block 21 and the sides of the feed hopper, and also to some extent into the discharge opening 48 of the feed slot 24. Therefore it is important that the sides of the feed hopper 34 be provided with guides 62 for the block 21 which are made of a material to which the plastic will not adhere, and that the bottom walls of the slot 24 be made of a like material. It has been found that the comparatively new polymeric resin composed of tetrafluoroethylene, $C_2F_4$, which is sold under the trade name "Teflon" by E. I. du Pont de Nemours & Company of Wilmington, Delaware, has excellent adhesion resistant properties, and the plastic material in the feed hopper 34 does not adhere thereto. Therefore the foregoing surfaces, which come in contact with the plastic material are preferably made of a tetrafluoroethylene polymeric resin, and for convenience the block 21, and the guides 62 therefor on the sides of the hopper 34 are made entirely of such resin.

The following physical and mechanical properties of "Teflon" makes it particularly suitable for use in the feed block 21 and the guides 62 therefor:

to the accumulated excess material 73 to cause it to flow rearwardly and be returned to the trough 74 at the receiving end of the screw, as indicated by the arrows E. The plunger 70 is slidable in guides 75, and yieldable pressure is exerted thereon by a pair of springs 76, which are interposed between the plunger 70 and a stationary support 77. A screw stud 78 secures the guides 75 and the support 77 to the extruder 69.

The plastic supply strip 63 is drawn into the receiving end 67 of the extruder and into the trough 74 as previously described in reference to the foregoing modification. The receiving end 67 of the screw is constructed as described in reference to the preceding modification, and the excess accumulated material is squeezed out of the trough of the screw underneath the plunger 70, and the plunger returns the excess material to the extruder barrel as previously described.

Still another modified form of the invention is illustrated in Fig. 8, in which pelletized material 80 is fed to the extruder hopper 81, and into the receiving end 82 of the feed screw 83, which is also constructed as described in reference to the main form of the invention as shown in Figs. 1 to 6 inclusive. The pelletized plastic material 80 is fed into the receiving end of the feeding screw in rear of a plunger 84 which applies yieldable

*Physical and mechanical properties of Teflon*

| Property | Conditions | Units | Value | Test method [c] |
|---|---|---|---|---|
| Tensile strength | 77 F | p.s.i. | 1,500–2,500 [a] | D638–46T. |
| Elongation | 77 F | percent | 100–200 | D638–46T. |
| Flexural strength | 77 F | p.s.i. | Did not break. | D790–45T. |
| Stiffness | 77 F | p.s.i. | 60,000 | D790–45T. |
| Impact strength: | | | | |
| Izod | −70 F | ft.-lb./in | 2.0 | D256–47T. |
| Izod | 77 F | ft.-lb./in | 4.0 | D256–47T. |
| Izod | 170 F | ft.-lb./in | 6.0 | D256–47T. |
| Hardness, durometer | | | D55–D70 | D676–47T. |
| Compressive stress | 0.1% deformation | p.s.i. | 1,700 | D695–44T. |
| Coefficient of linear thermal expansion | 77–140 F | per deg | $5.5 \times 10^{-5}$ | D696[b]–44. |
| Thermal conductivity | | B.t.u./hr./sq. ft./deg. F./in. | 1.7 | |
| Specific heat | | B.t.u./lb./deg. F | 0.25 | |
| Deformation under load | 122 F–85 hr.—1,200 p.s.i. | percent | 4–8 | D621–48T. |
| Heat distortion temp | 66 p.s.i. | deg. F | 270 | D648B–45T. |
| Water absorption | | percent | 0 | D570–42. |
| Specific gravity | | | 2.1–2.3 | D792–48T. |

[a] Higher for oriented film.
[b] Measured by Cenco-Fitch apparatus.
[c] The specifications for the test method are found in A.S.T.M.'s Standards 1946 and supplements thereto for the years of 1947 and 1948—published by American Society of Testing Materials, 1916 Race Street, Philadelphia, Pa.

Referring to Fig. 5, the angularity of the axis 14a of the reel 13 is particularly arranged to handle plastic strip material 12, which has substantial plastic flow and is too weak to sustain a strong pull. If the axis is arranged horizontally, the material flows and the reel becomes oval or eccentric to its axis. In that event and in the event the axis is arranged vertically, it requires a strong pull to uncoil the strip material 12 from the reel 13; and the strip material is often detrimentally stretched or broken when pulled from the reel by the feed screw. It has been found that where the axis of the reel 14a is placed at an angle of approximately 60° to the horizontal, as shown in Fig. 5, the concentricity of the reel with its axis may be maintained, and the strip material 12 may be pulled continuously therefrom by the extruder screw without injuriously stretching or breaking the strip.

It is not essential that the feed strip of plastic material be fed through a slot in the feed block. As shown in Fig. 7, the material supply strip 63 is fed into the feed hopper 64 through an opening 65 at the rear end 66 of the receiving end 67 of the feed screw 68 for the extruder 69, and a spring pressed plunger 70 is interposed between the feed strip 63 and the entrance 71 to the extruder barrel 72 for the purpose of applying pressure pressure to the accumulated excess material 85, and causes it to return to the trough 86 of the feed screw as previously described. Plungers 84, 70 and guides therefor may be "Teflon."

Pressure is applied to the plunger 84 by a pair of springs 86', which are compressed between the top of the block and a stationary support 87. The plunger 84 rises and falls under the pressure of the accumulated excess material 85 and against the pressure of the springs 86' as previously described.

The pelletized material 80 is automatically fed into the trough 86 of the feed screw as it is cleared by the revolving action of the screw which forces the material in the trough into the extruder barrel. The accumulated excess material 85 is being constantly returned to the trough, and the material in the trough is being forced into the barrel in proportion to, and at the rate of the extrusion of the material through the extruder die. As the trough 86 is cleared, the pelletized material will fill up the empty space therein and be automatically fed, or drawn into the screw, as such material is required to replace the plastic discharged from the die.

A further modification of the feeding mechanism is disclosed in Figs. 9 to 11, in which certain additional improvements are embodied. As shown in Fig. 9 the feed plunger 88 is slidably mounted in guide ways 89. The upward movement of the plunger 88 by the accumulated excess material at the inner end 90 of the plunger is resisted by a pair of springs 91, which are interposed between a stationary arm 92 and spring socket plate 93, which is attached to the top of the plunger 88 by screws 94 which extend through the plate 93 and are threaded into a plate 95, the plate 95 being attached to the top of the block 88 by screws 96 which pass through the plate 95 and are threaded into the top of the block 88.

The axis of the springs 91 are in alignment with the reciprocating movement of the plunger 88, so that substantially all of the components of the forces exerted by the springs 91 are parallel to the movement of the block and permits a smoother action, with less wear on the plunger and the guide ways.

In order to permit the use of springs having different amounts of deflection, as in the case of springs of different strengths, and still provide the necessary space at the end 91 of the plunger 88 for the accommodation of the required volume of accumulated excess material, a space 97 is provided between the tops of the springs 91 and the arm 92 when the plunger is in its lowermost position as shown in Fig. 9. By virtue of this construction the bottom 90 of the plunger may rise freely under the pressure of the accumulated excess material from its initial position in order to provide a certain volume of space for such material before the pressure is exerted by the springs 91. Then, the springs having different deflections will be able to be compressed, or deflected an amount sufficient to provide the additional volume required for the maximum volume desired for the accumulated excess material.

The arm 92 is affixed to a support 97, which is attached to the side of the housing 98 for the receiving end 99 of the feed screw by machine screws 100. The top of the support 97 is provided with two slots 101 having a rectangular cross-sectional shape, but the top side of the slots diverges from the bottom of the slot towards the spring end of the arm. The arm 92 is provided with two rectangular shaped prongs 103, which extend into the slots 101. Screws 104 are threaded into the top of the slots 101, and shoulders 105 at the inner end of the screws bear against the top of the prongs 103 to clamp the arm in place. Pins 106 extend through the prongs 103 and into sockets in the bottom of the slots 101 to further secure the prongs 103 against movement lengthwise of the slots 101. The divergence of the top side of the slots 101 facilitates the removal of the spring arm 92 for the purpose of making repairs, cleaning the equipment, or changing the springs 91, and substituting springs of a different strength. In order to remove the arm the screws 104 are removed, and the arm 92 may be moved up to the dot and dash line position 107. The spring centering projections 108 on the arm 92 will then clear the top of the springs 91 and the arm 92 may be removed from the slots 101 to permit the remaining mechanism to be disassembled. The slots 101 act as a safety device to prevent the arm 92 from jumping up and striking the operator, in the event the screws 104 are removed while pressure is on the springs 91.

As shown in Figs. 10 and 11, the feed slot 109 in the plunger 88 is elongated and its greater dimension extends in the direction of the axis of the feed screw. The narrower sides 110 slant downwardly towards the feed screw 99 and towards the rear end thereof, or away from the entrance 111 to the extruder barrel 112. The purpose of this slope is to more evenly distribute the mass of material in the plunger 88 between the front end 113 and the rear end 114 of the feed plunger 88, whereby the strength of the plunger is increased and its resistance against deformation is also increased. In this construction the relationship to the discharge opening 114' in respect to the pressure areas against which the accumulated excess material bears is maintained as shown and described in respect to Fig. 6 of the drawings.

The plunger 88 is preferably made of "Teflon," and it is reinforced against deformation by steel pins 115, 116, 117 extending longitudinally, transversely, and up and down, respectively, in the plunger 88. All of the pins are inserted in the plunger by boring holes in the plunger and substantially filling them with the pins. As viewed in Fig. 9 the holes for the pins 115 are bored from the right side, the holes for the pins 116 are bored from the rear end, and the holes for the pins 117 are bored from the top side, and in each case the "Teflon" material of the block is left at the bottom of the bore so that the plastic material being worked by the extruder will not enter the bottom of the bores, where the tendency of the "crepe" of the plastic is greatest, which results from the greater pressures acting on the bottom 90 of the plunger 88 below and in line with the material left in the bores. The term "crepe" as used herein refers to the flow of a very thin film of plastic between the plunger 88 and the guide ways 89.

The guide ways 89 are preferably made of "Teflon" sheet material, which is bonded to a steel box-like insert 118. The Teflon sheet material is cut to fit into the recessed sides 119 of the insert 118, and is bonded to such sides. The lined insert 118 is secured in an opening 120 in the housing 98 for the receiving end of the feed screw 99 by screws 121. The "Teflon" guide ways 89 project beyond the surface of the unrecessed margins 122 of the steel insert 118 so that the plunger 88 will not come in contact with the metal at the top of the insert during its reciprocation. The margins 122 also protect the edges of the "Teflon" guide ways throughout their top and bottom edges. A plate 123 surrounds the top of the insert 118 and is secured to the top of the housing 98 by screws 124 to finish off the top of the opening 120 in the housing 98, and to provide a bottom stop for the plunger 88 when the plate 95 attached thereto comes in contact with the plate 123.

In the operation of the extruder, the feed screw 99 revolves in the direction of the arrow F as shown in Fig. 9, and as the strip of plastic is fed through the feed slot 109 into the receiving end of the feed screw 99, the plastic material is pushed through the extruder barrel 112 in the direction of the arrow G in Fig. 11. The accumulated excess material as it builds up exerts pressure on the inner end 90 of the feed plunger 88, which freely rides up to provide space for the accumulated excess material until the upper end of the springs 91 strike the arm 92, and then the springs 91 applies pressure to the accumulated excess material. At a certain point in the rise of the plunger, a pulsating balance is reached between the intake of the plastic material and the amount extruded from the barrel as previously described in reference to the modification of the invention shown in Figs. 1 to 5 inclusive. After the block has reached such pulsating balance, and if all of the operating conditions remain the same, the block will remain in the balanced condition.

Under some conditions of operation a fixed block may be used having its ends spaced from the extruded screw at a distance equal to the distance of the bottom of the block in such balanced condition as above. Referring to Fig. 12 a mechanism for moving and fixing the block in such position is shown. In the construction shown in Fig. 12, it is not important that the sides of the block 125 be made of material which is resistant to adhesion of the plastic compound. It is only important that the bottom of the block be resistant to adhesion, and the block may be made of steel and provided with a chromium plated bottom surface 126 to resist the adhesion of the plastic. Otherwise the block will be constructed as shown in the previous figures.

The block 125 may be fixed in any desired position by one or more hand operated screws 127 having its lower end rotatably attached to a plate 128 affixed to the block 125. The screw 127 is threaded into a support 129 which is attached to the sides of the housing 130 for the receiving end of the extruder screw 131 by bolts 132. The upper end of the feed screw 127 is provided with an adjusting hand wheel 133. In this construction the lowest position of the bottom 126 of the feed block 125 is located a substantial distance from the feed screw to provide for the minimum accumulation of excess material. The block 125 may be adjusted to larger volumes of accumulated excess material as may be required by the hand wheel 133.

It is to be understood that the improved feed screw 23 described in reference to Figs. 1 to 8 inclusive, is suitable for use in the modification of the invention shown in Figs. 9 to 12, inclusive, and such screw is a part of the combination disclosed in said last mentioned modifications.

While the preferred forms of this invention have been described herein, it will be understood that changes may be made therein without departing from the spirit of the invention, and it is intended to cover all such changes which come within the scope of the appended claims.

This application is a continuation-in-part of application Serial No. 420,503, filed April 2, 1954.

Having thus described my invention, what I claim and desire to protect by Letters Patent is:

1. The combination of an extruder and an improved mechanism for feeding plastic material thereto, said extruder comprising a screw, a barrel for enclosing a forward portion of said screw, the rear end of said screw extending beyond said barrel to receive plastic material to be conveyed through said barrel, a housing for said rear end of said screw, said housing having a cavity therein for receiving the plastic material at a point removed from the entrance to said barrel and for receiving accumulated excess material at said barrel entrance, said improved mechanism for feeding plastic material to said extruder comprising a slidable plunger and a mounting therefor in said housing at said barrel entrance, and resilient means for forcing said plunger towards the axis of said screw, said plunger having a curved continuous bottom surface having one edge adjacent to and conforming substantially to the contour of said barrel entrance and against which the accumulated excess material exerts pressure to move said plunger in opposition to said resilient means, the periphery of said surface being sealed along said plunger mounting against the passage of the accumulated excess material in contact therewith, said bottom surface extending axially from said entrance to enclose a portion of said housing cavity and provide sufficient space for the accumulated excess material to expand into and for the plastic material to pass to said rear end of said screw and underneath said plunger, said plunger having a slot therein for the passage of the plastic material in strip form to said rear end of said screw, said slot having an elongated cross section extending in the axial direction of said screw.

2. The combination defined in claim 1, in which the narrower sides of said slot are inclined inwardly and rearwardly, thereby to distribute the plastic material more equally between the rear and front ends of said plunger.

3. The combination defined in claim 1, in which said improved mechanism for feeding plastic material includes the rear end of said screw which is provided with less flights thereon up to a point adjacent to but in rear of said barrel entrance than the portion of said screw extending from said point into said barrel.

References Cited in the file of this patent

UNITED STATES PATENTS

| | | |
|---|---|---|
| 1,246,193 | Wolforsdorf | Nov. 13, 1917 |
| 2,422,722 | Fielitz | June 24, 1947 |
| 2,519,014 | Bankey | Aug. 15, 1950 |
| 2,615,199 | Fuller | Oct. 28, 1952 |
| 2,765,490 | Zona | Oct. 9, 1956 |

FOREIGN PATENTS

| | | |
|---|---|---|
| 41,053 | Denmark | Oct. 28, 1929 |
| 273,455 | Great Britain | July 7, 1927 |
| 487,948 | Great Britain | June 29, 1938 |
| 413,474 | Italy | Apr. 24, 1946 |